United States Patent
Cooper

(10) Patent No.: US 6,904,282 B2
(45) Date of Patent: Jun. 7, 2005

(54) METHOD AND APPARATUS FOR IDENTIFYING AND ACQUIRING PREFERRED WIRELESS COMMUNICATIONS SYSTEMS

(75) Inventor: Rotem Cooper, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 564 days.

(21) Appl. No.: 09/991,070

(22) Filed: Nov. 16, 2001

(65) Prior Publication Data

US 2003/0096611 A1 May 22, 2003

(51) Int. Cl.[7] .............................................. H04Q 7/20
(52) U.S. Cl. ...................... 455/434; 455/574; 455/522; 455/422.1; 455/552.1; 370/320; 370/335; 370/337; 370/342
(58) Field of Search ................................ 455/434, 437, 455/432.1, 552.1, 522, 574, 426.1, 456.1; 370/320, 335, 342, 347, 336, 337

(56) References Cited

U.S. PATENT DOCUMENTS

| | | | |
|---|---|---|---|
| 5,790,952 A | | 8/1998 | Seazholtz et al. |
| 5,870,674 A | * | 2/1999 | English .................... 455/432.2 |
| 6,016,427 A | * | 1/2000 | Barber et al. ............... 455/434 |
| 6,018,661 A | * | 1/2000 | Raith et al. ................. 455/437 |
| 6,259,917 B1 | * | 7/2001 | Elzein ..................... 455/435.2 |
| 6,405,038 B1 | * | 6/2002 | Barber et al. ............... 455/434 |
| 6,577,608 B1 | * | 6/2003 | Moon et al. ................ 370/311 |

FOREIGN PATENT DOCUMENTS

| | | |
|---|---|---|
| WO | 0027158 | 5/2000 |
| WO | 0059255 | 10/2000 |
| WO | 0103464 | 1/2001 |

* cited by examiner

Primary Examiner—William Trost
Assistant Examiner—Danh C Le
(74) Attorney, Agent, or Firm—Philip Wadsworth; Bruce W. Greenhaus; Donald C. Kordich

(57) ABSTRACT

In a mobile station having an acquired wireless communications system, the mobile station performs preliminary searches for more desirable wireless communications systems in between paging channel and quick paging channel assigned slots, while successfully monitoring the mobile station's assigned slots. The mobile station then analyzes the preliminary search results and attempts to acquire the more desirable wireless communications systems that meets preliminary search criteria. The mobile station includes a communications transceiver that facilitates wireless communications with a local base station and processing circuitry adapted to control a slotted operation mode of the mobile station. The processing circuitry is adapted to instruct the communications transceiver to listen for incoming messages from the acquired communications system during slot modes and listen for candidate communications systems during slot-off modes. The preliminary searches include performing tests on the signal received on a candidate communications system channel. The tests may include measuring the signal strength, calculating the ratio $E_c/I_o$ and demodulating a synchronization signal.

18 Claims, 4 Drawing Sheets

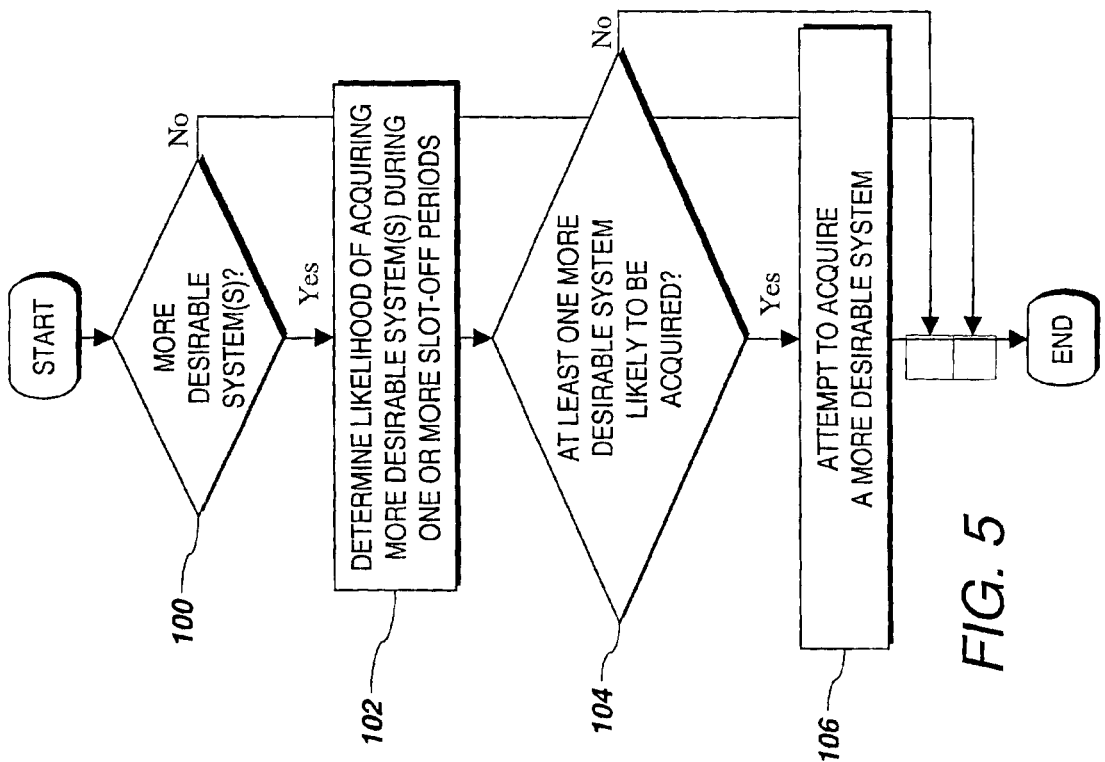
FIG. 5
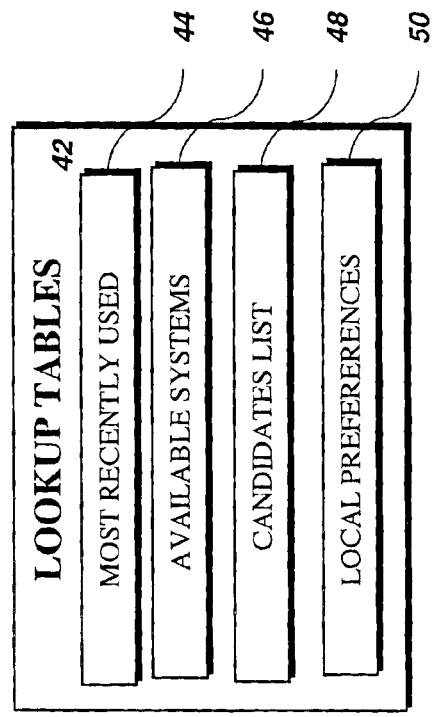
FIG. 3a
FIG. 3b
FIG. 4

METHOD AND APPARATUS FOR IDENTIFYING AND ACQUIRING PREFERRED WIRELESS COMMUNICATIONS SYSTEMS

BACKGROUND OF THE INVENTION

1. Field of the Invention

The present invention relates generally to wireless communications and, in particular, to a method and apparatus for identifying and acquiring a wireless communications system that is more desirable than a current wireless communications system.

2. Description of the Related Art

A mobile device may have access to more than one wireless communications system in its current geographic region. The quality of the wireless services available to the mobile device will vary from system to system depending on the equipment used by each system, the features of the mobile device, the distance between the mobile device and local base stations, physical obstructions such as buildings and hills, and the volume of communications traffic on each system. The wireless communications systems may also support different multiple-access wireless communications protocols such as code division multiple access (CDMA), wideband code division multiple access (WCDMA), time division multiple access (TDMA), Advanced Mobile Phone System (AMPS) or Global System for Mobile Communications (GSM). In addition, the fees charged to a user of the mobile device often vary depending on the time of day, the duration of the connection with the wireless communications system and whether the mobile device is listed as a subscriber of the wireless communications system.

To assist with the selection of a wireless communications system, conventional mobile devices store data describing each known wireless communications system in a systems table. Each entry in the systems table includes a system identifier (SID), a network identifier (NID), and acquisition parameters including band, frequency and mode. The wireless communications systems are often grouped by geographic region, and sorted from the most desirable to the least desirable system in each region. The most desirable system in a particular geographic region is typically a subscriber system, but may also be a roaming system that offers the mobile device the best combination of low cost and high quality of service. Roaming systems offer wireless services to non-subscriber mobile devices, usually at a much higher fee than subscription services, and may be desirable when the mobile device enters a geographic region that is outside the coverage area of the mobile device's subscription service, when the subscription services are blocked or otherwise unavailable, or when the subscription services are only available at an unacceptably low level of quality.

When activated, a conventional mobile device attempts to acquire the most desirable wireless communications system that is available in the current geographic region. The mobile device may determine its current geographic region by acquiring a first wireless communications system and locating its corresponding entry in the systems table. In one approach, the mobile device maintains a table of the wireless communications systems that were recently used by the mobile device, and the mobile device attempts to acquire one of these systems upon activation. In another approach, the mobile device initially attempts to acquire the wireless communications systems that are known to be the easiest to locate. For example, some wireless communications systems in different geographic regions use the same acquisition parameters, increasing the likelihood that the mobile device will be able to acquire a system when using these parameters, regardless of the current geographic region. Once a wireless communications system is acquired, the mobile device searches for the SID/NID pair of the acquired system in the systems table to determine its corresponding geographic region. The mobile device then searches the systems table for the most desirable system in the identified geographic region and attempts to acquire that system. If the mobile device is unable to acquire the most desirable system, the mobile device steps through the other entries in the current geographic region, from the most desirable to the least desirable, until a wireless communications system is acquired.

The use of a systems table to acquire the most desirable system does not guarantee that the mobile device will be always be connected to the most desirable system that is available in its current geographic region. During system acquisition, for example, the most desirable system may have been temporarily blocked or weakened by physical obstructions, forcing the mobile device to acquire a less desirable system. Even if the most desirable system is initially acquired, the systems that are available to the mobile device may change as the position of the mobile device and its surrounding environment changes. To provide the user of the mobile device with the best combination of high quality and low cost, some mobile devices periodically identify and attempt to acquire a wireless communications system that is more desirable than the current wireless communications system used by the mobile device. In operation, the mobile device searches the systems table for wireless communications systems in the current geographic region that are more desirable than the current communications system. If more desirable systems are found, the mobile device switches away from the current communications channel and attempts to acquire one of the more desirable systems.

Although it is beneficial to communicate using the most desirable wireless communications system that is available to the mobile device in the current geographic region, the approach describe above has many drawbacks. For example, it is common for the mobile device to leave the current communications channel for up to 10 seconds every 60 seconds while attempting to acquire a more desirable system. The duration of time that the mobile device is away from the current communications channel will depend on many factors, including the number of searches that must be performed in order to acquire a more desirable system and the communications protocol used by each of the wireless communications systems. While the mobile device is searching for wireless communications systems on other channels, the mobile device may miss important pages, telephone calls and other incoming communications from the current wireless communications system. In addition, this frequent and prolonged switching away from the current wireless communications system increases the likelihood that the current system will be lost when the signal is weak. Further, the numerous acquisition attempts that are performed in this approach drain the battery power of the mobile device, reducing its standby time.

In view of the above, there is a need in the art for an improved method and apparatus for identifying and acquiring a wireless communications system that is more desirable than a current wireless communications system.

SUMMARY OF THE INVENTION

The present invention is an improved method and apparatus for identifying and acquiring a wireless communications system that is more desirable than the communications system currently used by a mobile station. In one embodiment, a mobile station performs preliminary searches for more desirable wireless communications systems in between paging channel and quick paging channel assigned slots while successfully monitoring the mobile station's assigned slots. The mobile station may then attempt to acquire the more desirable systems that satisfy certain preliminary search criteria.

In a preferred embodiment, a mobile station includes a systems table that stores a list of wireless communications systems that are known to the mobile station. Each record in the systems table includes data that describes a unique SID/NID pair of a corresponding wireless communications system. The mobile station also stores acquisition parameters for each wireless communications system, such as band, frequency and mode, an identifier of the system's corresponding geographic region and a relative desirability of the wireless communications system.

In operation, the mobile station establishes a wireless communications link with a local base station and periodically determines whether the current communications system is the most desirable system in the current geographic region. The mobile station's current geographic region may be identified by locating the SID and NID received by the base station in the systems table. The mobile station may then search the systems table for candidate systems in the same geographic region and that have a relative desirability that is greater than the relative desirability of the current system. If at least one candidate system is found, the mobile device analyzes the candidate system during a slot-off period, while continuing to monitor the slot period assigned by the base station. Based on the analysis of the candidate system, the mobile station determines whether the candidate system is likely or unlikely to be acquired by the mobile station. The mobile station then attempts to acquire the candidate systems that are likely to be acquired.

The mobile station preferably includes processing circuitry, a memory, a communications transceiver and an antenna. The processing circuitry includes a control processor that controls the mobile station's slotted sleep mode, a signal processor that processes communications signals, a searcher and a system determination unit. The memory includes both volatile and nonvolatile random access memories that store a systems table, an acquisition table, and at least one lookup table. The communications transceiver is preferably adapted to receive and transmit both analog and digital signals such as AMPS and CDMA, respectively, through the antenna. The searcher is adapted to identify valid signals, such as pilot signals and paging channels, received by the transceiver, and to perform a preliminary acquisition analysis of one or more candidate communications systems. The preliminary acquisition analysis may be performed in a dedicated mode or in a background mode during slot-off periods. The system determination unit is adapted to determine whether the current communications system is the most desirable system in the current geographic region and, when more desirable systems are available, initiate attempts by the mobile station to acquire a more desirable system.

When activated, the mobile station attempts to acquire the most desirable wireless communications system that is available in the mobile station's current geographic region. The local base station of the acquired wireless communications system uses a paging channel, and in some embodiments a quick paging channel, to notify the mobile station of incoming messages, such as an incoming telephone call or a received voicemail message. When the mobile station is idle, it enters a slotted sleep mode during which the mobile station cycles between a slot-off period and a slot period. During the slot-off period, the mobile station shuts down the transceiver and other electronics to preserve battery power. The mobile station wakes up at predetermined time intervals (i.e., slot periods), turns on the transceiver and listens for incoming message on the paging channel. If no messages are received that require the mobile station to stay awake, the mobile station goes back to sleep during the next slot-off period.

The initially acquired wireless communications system may not be the most desirable system available in the mobile station's current geographic region. In a preferred embodiment for identifying and acquiring a wireless communications system that is more desirable than the current communications system the mobile station first determines whether the current communications system is the most desirable system available in the current geographic region. If at least one more desirable system is found then the mobile station determines the likelihood that each of the more desirable systems will be acquired. This determination is preferably performed during one or more slot-off periods. If at least one more desirable system is likely to be acquired, then the mobile station attempts to acquire one of the more desirable systems.

To determine the likelihood that a candidate communications system will be acquired, the mobile station performs one or more tests on the candidate communications system. In a preferred embodiment, the system determination unit selects one or more candidate communications systems and the searcher tests each candidate communications system during one or more slot-off periods. In operation, the searcher waits for a slot-off period, selects a candidate system, switches to the channel of the selected system and tests the received signal. In a first embodiment, the test performed by the searcher includes measuring the received signal strength (Rx) during the slot-off period. If the received signal strength measurement is relatively low, there would be a low probability that the candidate system would be available for acquisition. If the measurement is relatively high, there would be a greater likelihood that the candidate system could be acquired. If there is one or more candidate systems remaining to be tested, the time remaining in the slot-off period is checked to determine whether another test can be performed within the slot-off period. If an additional test can be performed, then the next candidate system is selected and tested. If the time remaining in the slot-off period is insufficient to test another candidate system, the mobile station returns to the current communications channel to monitor the next slot period, and waits for a subsequent slot-off period before selecting and testing the next candidate system. When there are no more candidate systems to test, the searcher switches back to the current communications channel before the expiration of the current slot-off period. In alternate embodiments, the testing of candidate systems may terminate after a predetermined number of candidate systems meet a minimum testing threshold, when interrupted by the control processor or system determination unit, when the mobile station changes states or other conditions are satisfied.

In a preferred embodiment, the candidate systems that have a corresponding measured signal strength lower than a threshold value (e.g., −90 db) are eliminated from the candidate systems list, and the remaining candidate systems are then sorted in order of desirability. Other criteria may also be used to eliminate and sort candidate systems. The mobile station then switches to the channel of the first candidate system and attempts to acquire the corresponding system. Any system acquisition method may be used including conventional system acquisition methods that are well-known in the art. If the more desirable system is found, the mobile station may register with the new system and use it for future communications. If the more desirable system is not found, the mobile station will attempt to acquire the next system from the candidate systems list. This process continues until a more desirable system is acquired, or until there are no additional candidate systems. If the mobile station fails to acquire a new system, then the mobile station will attempt to return to the previous communications system.

Other tests may also be performed on the candidate systems provided that the tests are capable of being performed within one or more slot-off periods and the test results assist in determining whether the candidate systems are likely to be acquired. In a first alternate embodiment, the analysis of the candidate systems includes demodulating the received signal to determine whether it is likely to be CDMA signal. In this embodiment, the mobile station measures the signal to noise ratio $E_c/I_o$, where $E_c$ is the strength of the received signal and $I_o$ is the total thermal noise received on the channel. If the ratio $E_c/I_o$ is relatively large, then there is a high probability that the CDMA system could be acquired. In a second alternate embodiment, the analysis of the candidate systems includes attempting to decode the synchronization messages of the candidate systems. If a synchronization message is decoded, the mobile station will obtain the transmitting base station's SID/NID pair. If the obtained SID/NID pair matches the SID/NID pair of the candidate system, then there is a strong likelihood that the candidate system may be acquired. In a third alternate embodiment, the mobile station supports multiple modes of measurement and acquisition, and may be adapted to use any of the approaches described above, alone or in combination. The tests to be performed on the candidate systems may be determined by user preferences, configuration of the mobile station, current operating state of the mobile station or other criteria. In addition, the analysis of candidate systems may be selectively performed in the background (during slot-off periods) or in a dedicated mode depending on the state of the mobile station.

A more complete understanding of the Method and Apparatus for Identifying and Selecting Preferred Wireless Communications Systems will be afforded to those skilled in the art, as well as a realization of additional advantages and objects thereof, by a consideration of the following detailed description of preferred embodiments. Reference will be made to the appended sheets of drawings, which will first be described briefly.

BRIEF DESCRIPTION OF THE DRAWINGS

The features, objects, and advantages of the present invention will become more apparent from the detailed description set forth below when taken in conjunction with the drawings in which like reference characters identify correspondingly throughout and wherein:

FIGS. 3a and 3b illustrate preferred embodiments of a system table and an acquisition table;

FIG. 4 illustrates a preferred embodiment of a lookup table memory;

FIG. 5 is a flow diagram illustrating a preferred algorithm for acquiring a more desirable wireless communications system.

DETAILED DESCRIPTION OF A PREFERRED EMBODIMENT

Figure 1:
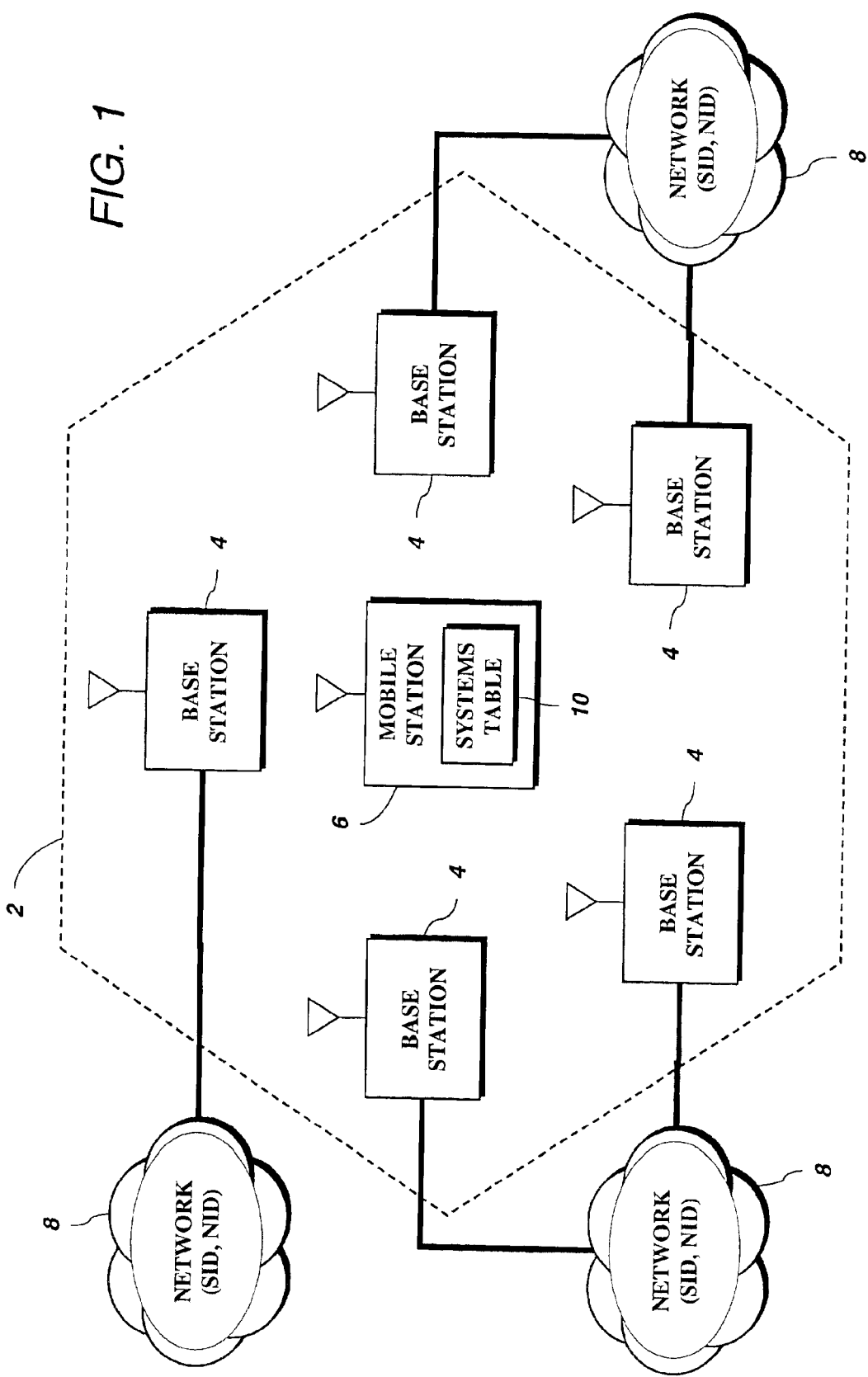
FIG. 1 illustrates a preferred operating environment of the present invention.

A preferred embodiment of the present invention is illustrated in FIGS. 1–6. Referring to FIG. 1, a geographic region 2 includes a plurality of base stations 4 that provide wireless services to local mobile stations, such as mobile station 6. Each base station 4 is connected to a network 8, which is part of a larger wireless communications system that supports at least one multiple-access wireless communications protocol such as code division multiple access (CDMA), wideband CDMA (WCDMA), time division multiple access (TDMA), frequency division multiple access (FDMA), Advanced Mobile Phone Service (AMPS), Global System for Mobile communications (GSM), Personal Communication Systems (PCS), General Packet Radio Services (GPRS) or High Data Rate (HDR) technology (e.g., 1×EV technology). The mobile station 6 may be any wireless device, whether stationary or mobile, that is adapted for wireless communications with at least one of the base stations 4, such as a cellular telephone, pager, personal digital assistant (PDA), vehicle navigation system or portable computer.

In a preferred embodiment, the mobile station 6 and at least one base station 4 are further adapted for slotted communications on paging and quick paging channels as known in the art. In slotted operation, the mobile station 6 cycles between a slot-off period and a slot period. During the slot-off period, the mobile station 6 shuts down its receiver and other electronics to preserve battery power during idle periods. During the slot period, the mobile station 6 turns on its receiver and listens for incoming messages from the base station 4.

The mobile station 6 includes a systems table 10 that stores a list of known wireless communications systems. In a preferred embodiment, each wireless communications system has a unique system identifier (SID) and, within each wireless communications system, each network 8 has a unique network identifier (NID). Each record in the systems table 10 stores data that describes a unique SID/NID pair, including corresponding acquisition parameters such as band, frequency and mode, an identifier of the system's corresponding geographic region, and a relative desirability of the wireless communications system. It is contemplated that, in alternative embodiments, other identification and acquisition parameters may be used in accordance with the present invention.

In a preferred operation, the mobile station 6 establishes a wireless communications link with one of the base stations 4 and periodically determines whether the corresponding wireless communications system is the most desirable system in the current geographic region 2. The mobile station's current geographic region 2 may be identified by locating the SID and NID of the current communications system in the systems table 10. The mobile station 6 then searches the systems table 10 for candidate systems from the same geographic region that have a relative desirability that is greater than the relative desirability of the current system. If at least one candidate system is found, the mobile device 6 analyzes the candidate system during a slot-off period, while continuing to monitor the slot period assigned by the current communications system. Based on the analysis of the candidate system, the mobile device 6 may determine whether the candidate system is likely or unlikely to be acquired by the mobile station 6. If acquisition is likely, the mobile station 6 attempts to acquire the candidate system.

Figure 2:
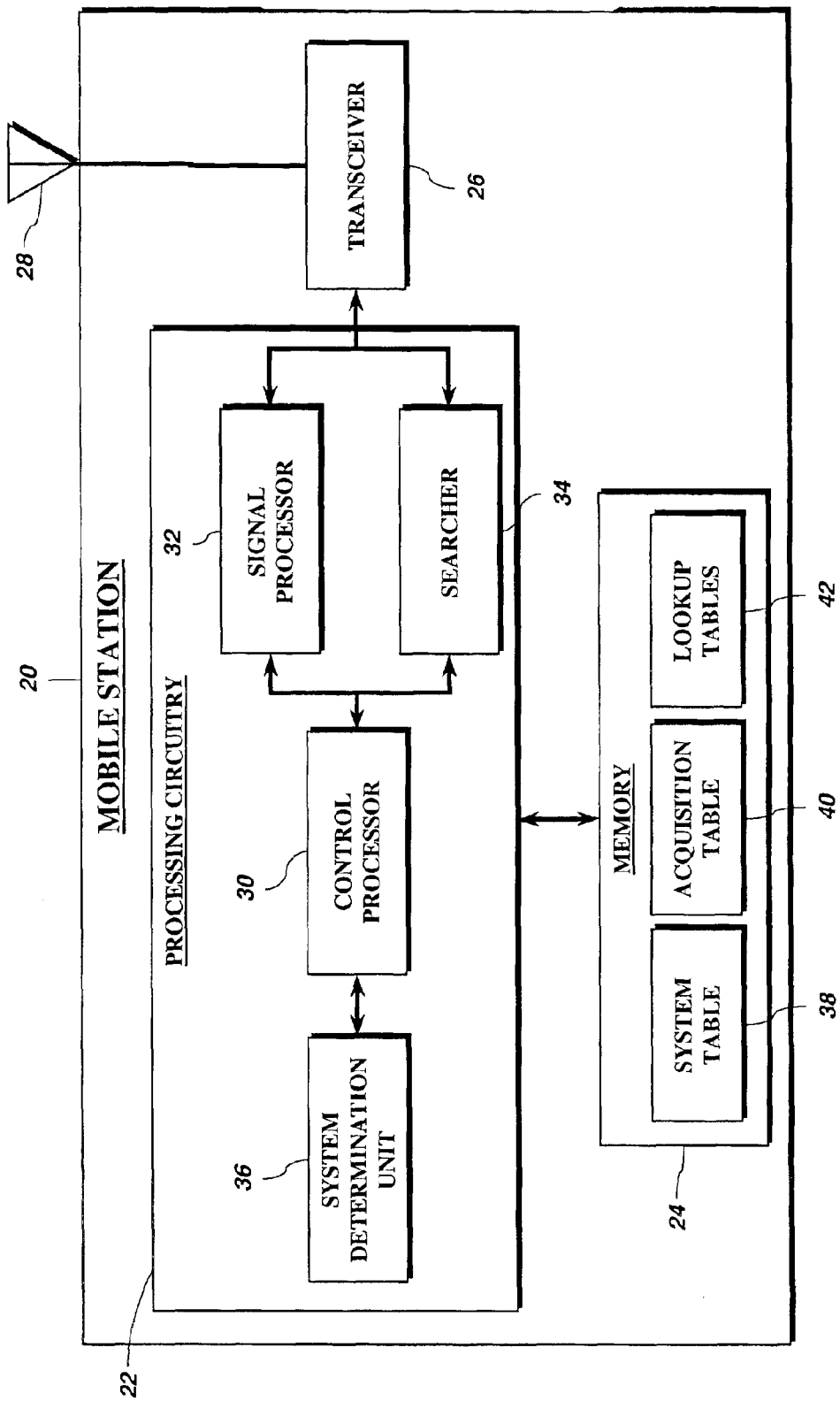
FIG. 2 is a preferred embodiment of a mobile station.

Referring to FIG. 2, a preferred embodiment of a mobile station 20 will now be described. The mobile station 20 includes processing circuitry 22, a memory 24, a communications transceiver 26 and an antenna 28. The processing circuitry 22 preferably includes a control processor 30, a signal processor 32, a searcher 34 and a system determination unit 36. The control processor 30 controls the operation of the mobile station 20, including the operation of a slotted sleep mode. The memory 24 includes both volatile and nonvolatile random access memories that store a systems table 38, an acquisition table 40 and at least one lookup table 42. In a preferred embodiment, the communications transceiver 26 is adapted to receive and transmit both analog and digital signals such as AMPS and CDMA, respectively, through the antenna 28.

The searcher 34 is adapted to identify valid signals, such as pilot signals and paging channels, received by the transceiver 26. The design and implementation of searcher hardware for CDMA acquisition is described in U.S. Pat. No. 5,109,390, entitled "DIVERSITY RECEIVER IN A CDMA CELLULAR TELEPHONE SYSTEM," assigned to the assignee of the present invention and incorporated herein by reference. The searcher 34 is further adapted to perform a preliminary acquisition analysis of one or more candidate communications systems. In a preferred embodiment, the preliminary acquisition analysis may be performed in a dedicated mode, or in a background mode during slot-off periods.

The system determination unit 36 is adapted to select one or more wireless communications systems from the systems table 38, and retrieve corresponding acquisition parameters from the acquisition table 40. The system determination unit 36 transmits the acquisition parameters to the searcher 34, which attempts to acquire one the selected systems. The system determination unit 36 preferably communicates with the control processor 30 and the searcher 34 through function calls. In a preferred embodiment, the control processor 30 communicates changes in mode, band, frequency, SID and NID to the system determination unit 36. Other function calls may relate to roaming preferences, emergency 911 services, and over-the-air service provisioning (OTASP). The system determination unit 36 is also adapted to determine whether the current communications system is the most desirable system in the current geographic region and, when more desirable systems are available, initiate attempts by the mobile station 20 to acquire a more desirable system.

It should be appreciated that the mobile station 20 illustrated in FIG. 2 is merely illustrative and that alternative configurations and additional features are contemplated within the scope and spirit of the present invention. For example, the components of the mobile station 20 may be implemented in numerous hardware configurations using conventional circuit elements such as one or more processors, memories and application specific integrated circuits (ASICs). The mobile station 20 may also be adapted for voice communications, high-speed data communications, video communications, internet applications such as email and World Wide Web access, position location (e.g., gpsOne™ developed by assignee), personal navigation, voice recognition, integrated removable storage devices and short-range wireless connectivity with local peripherals and devices. In a preferred embodiment, the processing circuitry 22 includes a Mobile Station Modem chipset, developed by assignee, which integrates digital and analog functions along with GPS-based position location.

Referring to FIGS. 3a and 3b, preferred embodiments of the system table 38 and the acquisition table 40 will now be described. The system table 38 includes one record for each known wireless communications system, including both preferred and negative systems. A wireless communications system is "known" if the mobile station 20 has attempted to acquire the system or if system information was transmitted to the mobile device 20 from an external source. In the system table 38, the wireless communications systems are preferably grouped by geographic region and stored in sorted order from the most desirable system in the region to the least desirable system in the region. The desirability of each system may be determined using criteria such as the cost of using the system, quality of the communications service, protocol used by the system, support for unique features and whether the mobile station 20 is a subscriber of the wireless communications system. As illustrated, each record in the system table 38 includes a system identifier (SID), network identifier (NID), an indication of whether the system is preferred or negative (i.e., for emergency use only), an identifier of the geographic region (GID) and a pointer to a record in the acquisition table 40. Other information may also be stored in the system table 38, such as a desirability rating (e.g., a numerical score) for each system. Each record in the acquisition table 40 includes a band, frequency, mode and any additional parameters that are necessary for acquisition of the systems listed in the system table 38. The system table 38 and the acquisition table 40 are preferably stored in a nonvolatile memory and updated periodically through downloads across a wireless connection from the subscription service or by another data transfer method.

As illustrated in FIG. 4, the memory 24 also includes one or more lookup tables. In a preferred embodiment the lookup tables include a most recently used (MRU) systems table 44 that stores a list of the systems most recently used by the mobile station 20, an available systems table 46 that includes systems that are likely to be available based on recent acquisition attempts, a candidates list 48 that includes a list of local systems that are more desirable than the current communications system, and a preferences table 50 that maintains local preference settings for the mobile station 20. Other information may also be stored in a lookup table including historical information that tracks the last time a system was acquired. The lookup tables are preferably stored in volatile portion of the memory 24, but in alternate embodiments, one or more of the lookup tables may be stored in a nonvolatile portion of the memory 24.

A preferred operation of the mobile station 20 will now be described. When activated, the mobile station 20 attempts to acquire the most preferred wireless communications system that is available in the mobile station's current geographic region. In a preferred embodiment, the system determination unit 36 selects a system from the MRU systems table 44 and instructs the searcher 24 to attempt acquisition of the selected system. The mobile station 20 is preferably a dual mode device that is adapted to acquire both CDMA and AMPS systems. To acquire a CDMA system, the mobile station 20 switches to the communications channel of the selected CDMA system and listens for a pilot signal. The searcher 34 attempts to verify the received pilot signal by testing various pseudorandom noise (PN) offsets in the received signal until a match is found. When the pilot signal is acquired, the mobile station 20 receives information for the forward CDMA channel and a phase reference for signal demodulation. Next, the mobile station 20 attempts to acquire the synchronization channel associated with the identified pilot channel. The synchronization channel transmits basic system information such as the unique SID/NID of the transmitting wireless communications system and network, and synchronization information. The mobile station 20 adjusts its timing in accordance with the received information and then switches to the base station's paging channel. The paging channel is used by a local base station of the current communications system to communicate with the mobile station 20 when the mobile station 20 is not assigned to a traffic channel. Through the paging channel, the base station notifies the mobile station 20 of incoming messages, such as an incoming telephone call or a notification of a received voicemail message.

If the searcher 34 is unable to acquire the selected system, the searcher 34 will preferably attempt to acquire each of the remaining systems stored in the MRU systems table 44, and subsequently, the systems stored in the systems table 38, until a wireless communications system is acquired. After a system is acquired, the system determination unit 36 searches for the acquired system's SID/NID pair in the systems table 38 to determine the acquired system's geographic region. The system determination unit 36 then searches the systems table 38 for wireless communications systems in the same geographic region as the acquired system that are more desirable than the acquired communications system. The system determination unit 36 then instructs the searcher 34 to acquire one of the more desirable systems, in order of desirability. If the searcher 34 is unable to acquire a more desirable system, the mobile device 20 may use the initially acquired wireless communications system for future wireless communications. It will be appreciated that any method for acquiring a wireless communications system may be used in accordance with the present invention. A method and apparatus for performing preferred system selection in a mobile station that is capable of operation in a plurality of geographic regions is disclosed in U.S. Pat. No. 6,085,085, entitled "METHOD AND APPARATUS FOR PERFORMING PREFERRED SYSTEM SELECTION," assigned to assignee, and is incorporated herein by reference.

When the mobile station 20 is idle, it preferably enters a slotted sleep mode during which the mobile station 20 cycles between a slot-off period and a slot period. During the slot-off period, the mobile station 20 shuts down the transceiver 26 and other electronics to preserve battery power. The mobile station 20 wakes up at predetermined time intervals (i.e., slot periods), turns on the transceiver 26 and listens for incoming message on the paging channel. If no messages are received that require the mobile station 20 to stay awake, the mobile station 20 goes back to sleep during the next slot-off period.

The current wireless communications system acquired and used by the mobile station 20 may not be the most desirable system available in the mobile station's current geographic region. For example, even if the mobile station 20 acquired the most desirable system that was available at the time of acquisition, the wireless communications systems available to the mobile station 20 are likely to change as the position of the mobile device 20 and its surrounding environment changes. A more desirable system may have been temporarily blocked or weakened due to physical obstructions or may have been out of range at the time of acquisition.

Referring to FIGS. 2 and 5, a preferred embodiment for acquiring a wireless communications system that is more desirable than the current communications system will now be described. In Step 100, the mobile station 20 determines whether the current communications system is the most desirable system available in the current geographic region. This determination is preferably made by the system determination unit 36, which locates the current SID/NID pair in the systems table 38 and then searches the systems table 38 for systems in the same geographic region that are more desirable than the current system. The results of this search are stored in a candidates list. If at least one more desirable system is found then, in Step 102, the system determination unit 36 instructs the searcher 34 to determine the likelihood that each of the candidate systems will be acquired. This determination is preferably performed during one or more slot-off periods. In Step 104, if at least one of the candidate communications systems is likely to be acquired, the system determination unit 36 instructs the searcher 34 to attempt acquisition of one of the candidate systems in Step 106. In a preferred embodiment, the algorithm illustrated in FIG. 5 is initiated by the system determination unit 36 in response to a change in the mobile station's state information, such as after the current communications system changes. For example, the algorithm may be implemented after a handoff between based stations as the mobile station 20 travels between cells. In an alternate embodiment, the algorithm of FIG. 5 is executed periodically to ensure that the mobile station is using the most desirable system available.

Figure 6:
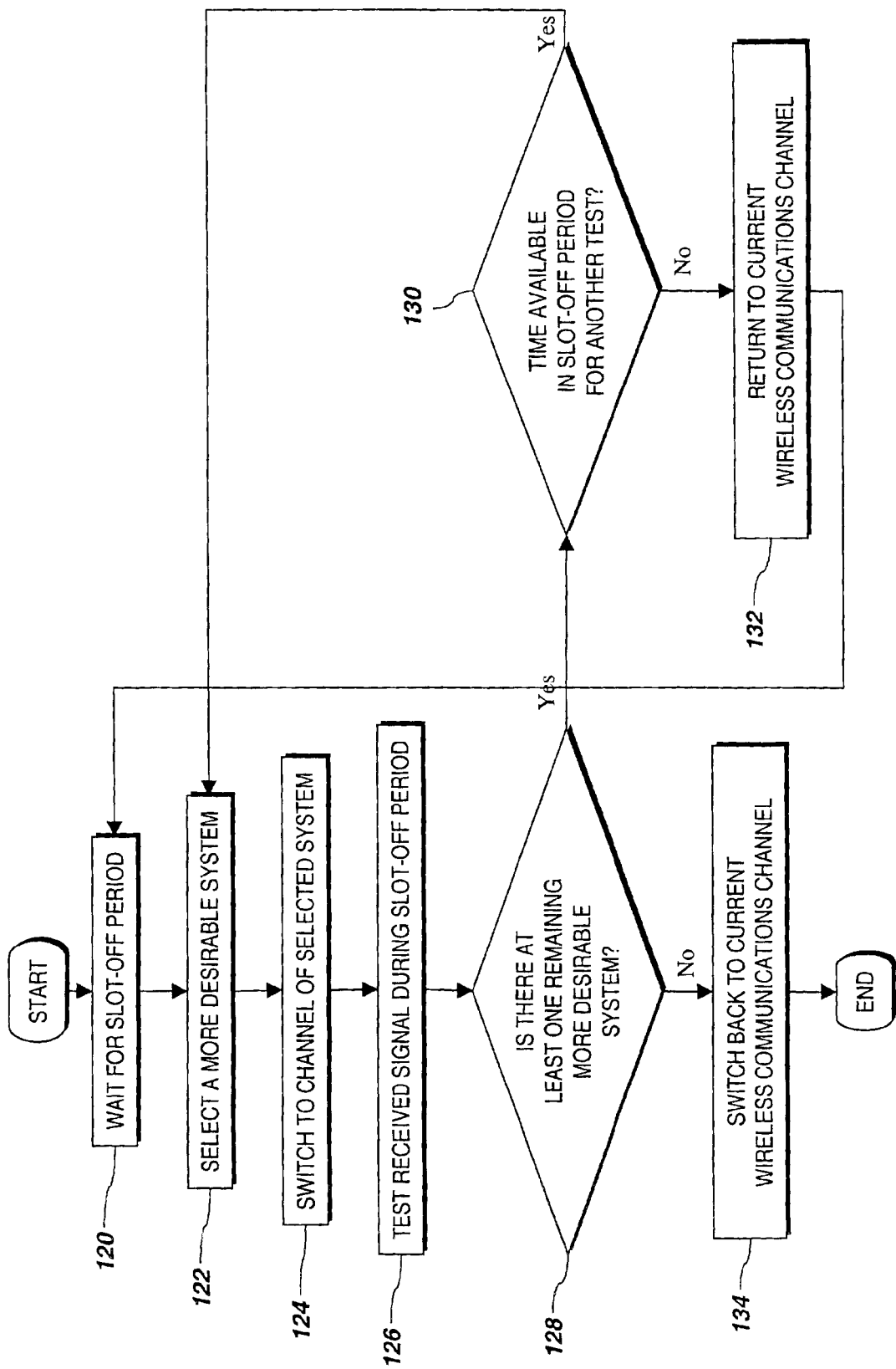
FIG. 6 is a flow diagram illustrating a preferred algorithm for determining whether a more desirable system is likely to be acquired.

Referring to FIGS. 2 and 6, a preferred algorithm for determining the likelihood of acquiring a candidate system (FIG. 5, Step 102) will now be described. In Step 120, the searcher 34 waits for the mobile station 20 to enter a slot-off period. In Step 122, the searcher 34 selects a more desirable system from the candidates list. In a preferred embodiment, the candidates list is a lookup table stored in a memory that includes each of the more desirable systems selected by the system determination unit 36. In an alternate embodiment, the candidates list may be transmitted to the searcher 34. In Step 124, the transceiver 26 switches to the channel of the selected system, and then the searcher 34 tests the received signal in Step 126. In a preferred embodiment, the test performed by the searcher 34 includes measuring the received signal strength (Rx) during the slot-off period. If the received signal strength measurement is relatively low, there would be a low probability that the candidate system would be available for acquisition. If the measurement is relatively high, there would be a greater probability that the candidate system could be acquired. In alternate embodiments, other tests may be performed on the received signal provided that the tests are capable of being performed within a slot-off period and the test results assist in determining whether the candidate system is likely to be acquired.

If there is at least one more candidate system to test (Step 128), the time remaining in the slot-off period is checked in Step 130 to determine whether another test can be performed within the slot-off period. If an additional test can be performed within the slot-off period, then control is passed back to Step 122 and the next candidate system is selected and tested. If the time remaining in the slot-off period is insufficient to test another candidate system, the mobile station 20 returns to the current communications channel in Step 132 to monitor the next slot period, and waits for a subsequent slot-off period in Step 120. When there are no more candidate systems to test, the searcher 34 switches back to the current communications channel in Step 134 before the expiration of the current slot-off period. In alternate embodiments, the algorithm of FIG. 6 may be terminated after a predetermined number of candidate systems meet a minimum measurement threshold, when interrupted by the control processor or system determination unit, when the mobile station changes states, or when other criteria is met.

Referring back to FIG. 5, in Step 104 candidate systems that have a corresponding measured signal strength lower than a threshold value (e.g., 90 db) are eliminated from the candidates list. In a preferred embodiment, the remaining candidate systems are then sorted in order of desirability. Other criteria may also be used to eliminate and sort candidate systems. For example, in a first alternate embodiment, the candidate systems may be sorted in order of measured strength. In a second alternate embodiment, a weighting factor is used that takes into account the measured signal strength and whether the system was recently used. In a third alternate embodiment, a predetermined number of candidate systems that have the highest measured strength are retained, and the rest of the candidate systems eliminated from the candidates list.

The mobile station next attempts to acquire one of the remaining candidate systems. The mobile station switches to the channel of the first candidate system and attempts to acquire the corresponding system. Any system acquisition method may be used including conventional system acquisition methods that are well-known in the art. If the more desirable system is found, the mobile station may register with the new system and use it for future communications. If the more desirable system is not found, the mobile station will attempt to acquire the next system from the candidates list. This process continues until a more desirable system is acquired, or until there are no additional candidate systems. If the mobile station fails to acquire a new system, then the mobile station will attempt to return to the previous communications system.

In an alternate embodiment, the test performed on the candidate system (FIG. 6, Step 126) includes demodulating the received signal to determine whether it is likely to be CDMA signal. The system determination unit 36 instructs the searcher 34 to measure the signal to noise ratio $E_c/I_o$, where $E_c$ is the strength of the received signal and $I_o$ is the total thermal noise received on the channel. In a CDMA system, this measurement provides an indication of the portion of the received signal that is usable. If the ratio $E_c/I_o$ is relatively large, then there is a high probability that the system could be acquired. The ratio $E_c/I_o$ provides a more reliable indication of whether the signal is likely to be acquired than the measured raw strength of the signal. This measurement, however, takes longer to calculate and it may require more slot periods to measure the potential candidate systems.

In a second alternate embodiment, the test performed in the candidate system (FIG. 6, Step 126) includes attempting to decode the synchronization message of the candidate system. If a synchronization message is decoded, the mobile station 20 will obtain the base station's SID/NID pair. If the obtained SID/NID pair matches the SID/NID pair of the candidate system, then there is a strong likelihood that the candidate system will be acquired.

In a third alternate embodiment, the system determination unit 36 and searcher 34 support multiple test modes and methods of acquisition, and may be adapted to use any of the approaches described above, alone or in combination. The test mode may be determined by user preference, configuration of the mobile station, current operating state of the mobile station or other criteria. In addition, the testing of candidate systems may be performed in the background (during slot-off periods) or in a dedicated mode depending on the state of the mobile station. For example, during power up and initial system selection, the signal strength of the available systems may be measured in a dedicated mode before any acquisition attempts are made, to eliminate systems that are unlikely to acquired.

In a preferred embodiment, the searcher 34 operates in accordance with instructions received from the system determination unit 36. The system determination unit 36 is preferably adapted to transmit a candidate systems test instruction and a system acquisition instruction. The candidate systems test instruction includes parameters to identify the candidate list, an identifier of the test to be performed on each candidate system, a minimum threshold value to be met by each system, the number of successful tests before returning the results to the system determination unit 36, and whether the test should be performed in dedicated or background mode. The searcher 34 executes the received instruction and returns the candidate systems that meet the testing requirements. In a preferred embodiment, the searcher 34 modifies the candidates list stored in memory. The system determination unit 36 is further adapted to analyze the test results and transmit a system acquisition instruction to the searcher 34, including parameters identifying the candidates lists.

Having thus described a preferred embodiment of the Method and Apparatus for Identifying and Acquiring a Preferred Wireless Communications System, it should be apparent to those skilled in the art that certain advantages of the within described system have been achieved. It should also be appreciated that various modifications, adaptations, and alternative embodiments thereof may be made within the scope and spirit of the present invention.

The scope of the present invention is defined by the following claims.

What is claimed is:

1. In a mobile station adapted for slotted operation on a current wireless communications system, a method for acquiring a wireless communications system comprising the steps of:

during a slot-off period, analyzing a signal received on a channel associated with a candidate communications system;

selecting a set of candidate communications systems, wherein the step of analyzing is repeated for each candidate communications system in the set, and wherein, for each candidate communications system in the set, the step of analyzing comprises the steps of:

switching to a channel associated with the candidate communications system; and testing the received signal wherein, if the time remaining in the current slot-off period is insufficient to complete the steps of switching and testing for the current candidate communications system, the mobile station returns to the current communications system until a subsequent slot-off period;

wherein the step of analyzing is resumed during a subsequent slot-off period;

determining, based on the analysis of the received signal, whether the candidate communications system is likely to be available for acquisition by the mobile station; and attempting to acquire the candidate communications system if it is determined that the candidate communications system is likely to be available for acquisition.

2. The method of claim 1 wherein, for each candidate communications system in the set, the steps of switching and testing are completed during a single slot-off period.

3. The method of claim 1 wherein the step of analyzing terminates when a predetermined condition is satisfied.

4. The method of claim 3 wherein the step of analyzing terminates when a predetermined number of received signals satisfy predetermined testing criteria.

5. The method of claim 1 wherein each candidate communications system is more desirable than the current communications system.

6. The method of claim 1 wherein the mobile station includes a table of known communications systems, each known communications system having a relative desirability, and wherein the set of candidate communications systems is selected from the table of known communications systems, and wherein each candidate communications system in the set has a relative desirability that is greater than the current communications system.

7. The method of claim 6 wherein a geographic region for each communications system is stored in the table of known communications systems and wherein the set of candidate communications systems includes only known communications systems in the same geographic region as the current communications system.

8. The method of claim 1 wherein the set of candidate communications systems includes at least one digital communications system and at least one analog communications system.

9. The method of claim 1 wherein the step of analyzing comprises the step of measuring the strength of the received signal.

10. The method of claim 9 wherein the candidate communications system is expected to be available if the measured strength of the received signal exceeds a predetermined threshold value.

11. The method of claim 10 further comprising the step of selecting a set of candidate communications systems, wherein the steps of analyzing and determining are repeated for each candidate communications system in the set.

12. The method of claim 11 wherein the step of attempting to acquire is performed for each candidate communications system that has a corresponding measured signal strength that exceeds the predetermined threshold value, until a candidate communications system is acquired or the candidate communications systems are exhausted.

13. The method of claim 12 wherein the step of determining comprises the step of sorting the candidate communications systems in order of desirability, the sorted order defining the order of attempted acquisition.

14. The method of claim 1 wherein the step of analyzing comprises the step of calculating a ratio Ec/Io of the received signal.

15. The method of claim 14 wherein the candidate communications system is expected to be available if the calculated ratio Ec/Io exceeds a predetermined threshold value.

16. The method of claim 1 wherein the step of analyzing comprises the step of attempting to decode the received signal.

17. The method of claim 1 wherein the stop of analyzing comprises the step of locating a SID and a NID in the received signal, and wherein the step of determining comprises the step of verifying that the located SID and NID match a SID and NID of the candidate communications system.

18. In a mobile station adapted for slotted operation on a current wireless communications system, a method for acquiring a wireless communications system comprising the steps of:

during a slot-off period, analyzing a signal received on a channel associated with a candidate communications system, wherein the step of analyzing comprises the step of measuring the strength of the received signal;

determining, based on the analysis of the received signal, whether the candidate communications system is likely to be available for acquisition by the mobile station, wherein the candidate communications system is expected to be available if the measured strength of the received signal exceeds a predetermined threshold value;

selecting a set of candidate communications systems, wherein the steps of analyzing and determining are repeated for each candidate communications system in the set; and attempting to acquire the candidate communications system if it is determined that the candidate communications system is likely to be available for acquisition, wherein the step of attempting to acquire is performed for each candidate communications system that has a corresponding measured signal strength that exceeds the predetermined threshold value, until a candidate communications system is acquired or the candidate communications systems are exhausted; and wherein the step of determining comprises the step of sorting the candidate communications systems in order of measured strength, the sorted order defining the order of attempted acquisition.

* * * * *